United States Patent
Wold et al.

(10) Patent No.: US 10,694,678 B2
(45) Date of Patent: Jun. 30, 2020

(54) COMBINE HARVESTER FAN HOUSING ASSEMBLY

(71) Applicant: Deere and Company, Moline, IL (US)

(72) Inventors: Matthew T. Wold, Coal Valley, IL (US); Kenneth J. Carter, Platteville, WI (US)

(73) Assignee: Deere & Company, Moline, IL (US)

( * ) Notice: Subject to any disclaimer, the term of this patent is extended or adjusted under 35 U.S.C. 154(b) by 129 days.

(21) Appl. No.: 15/965,946

(22) Filed: Apr. 29, 2018

(65) Prior Publication Data

US 2019/0327899 A1    Oct. 31, 2019

(51) Int. Cl.
*A01F 12/44*    (2006.01)

(52) U.S. Cl.
CPC .......... *A01F 12/444* (2013.01); *A01F 12/446* (2013.01)

(58) Field of Classification Search
CPC ...... A01F 12/444; A01F 12/48; A01F 12/446; A01D 41/1276; A01D 75/282; F04D 19/002
See application file for complete search history.

(56) References Cited

U.S. PATENT DOCUMENTS

| | | | | |
|---|---|---|---|---|
| 2,027,647 A | * | 1/1936 | Montgomery | F04D 19/002 415/131 |
| 2,849,118 A | * | 8/1958 | Ashton | A01F 12/444 209/318 |
| 2,954,123 A | * | 9/1960 | Gaunt | A01F 12/444 209/21 |
| 3,049,128 A | * | 8/1962 | Mark | A01F 12/444 460/85 |
| 3,392,832 A | * | 7/1968 | Allen | A01F 12/444 209/318 |
| 4,265,077 A | * | 5/1981 | Peters | A01F 12/444 56/14.6 |
| 4,303,079 A | * | 12/1981 | Claas | F04D 25/163 460/99 |
| 4,397,319 A | * | 8/1983 | Schuhmacher | B07B 9/00 460/100 |

(Continued)

FOREIGN PATENT DOCUMENTS

| | | | | |
|---|---|---|---|---|
| DE | 102017011233 | A1 * | 6/2019 | ........... A01F 12/444 |
| EP | 3087825 | A1 | 11/2016 | |

(Continued)

OTHER PUBLICATIONS

European Search Report issued in counterpart European Patent Application No. 19169569.1 dated Sep. 24, 2019 (5 pages).

*Primary Examiner* — Arpad Fabian-Kovacs
(74) *Attorney, Agent, or Firm* — Rathe Lindenbaum LLP (57) ABSTRACT

A combine harvester fan housing assembly may include a fan enclosure formed as a single unitary body out of a polymeric material. The fan enclosure may include a spiral duct spiraling about an axis, a first axial inlet opening sized to axially receive a fan therethrough and a second axial inlet opening and a discharge duct extending from the spiral duct. The combine harvester fan housing assembly may further include an inlet ring releasably mounted to the fan enclosure about the first axial opening, the inlet ring projecting into the first axial opening by an extent so as to extend radially inward of blade ends of the fan.

20 Claims, 8 Drawing Sheets

(56) References Cited

U.S. PATENT DOCUMENTS

| | | | | |
|---|---|---|---|---|
| 4,884,946 A | * | 12/1989 | Belanger | A47L 5/22 |
| | | | | 415/206 |
| 5,191,755 A | * | 3/1993 | Gryspeerdt | F16H 55/56 |
| | | | | 474/24 |
| 5,376,046 A | * | 12/1994 | Shuknecht | A01D 31/00 |
| | | | | 171/17 |
| 5,489,186 A | * | 2/1996 | Yapp | F01D 5/141 |
| | | | | 415/208.3 |
| 5,803,709 A | * | 9/1998 | Matthews | F04D 29/545 |
| | | | | 415/182.1 |
| D439,648 S | * | 3/2001 | Jones | D23/370 |
| 6,669,558 B1 | | 12/2003 | Wolters et al. | |
| 7,416,482 B2 | * | 8/2008 | Weichholdt | A01F 12/444 |
| | | | | 460/99 |
| 7,861,708 B1 | * | 1/2011 | Lyons | F04D 29/668 |
| | | | | 126/104 A |
| D701,299 S | * | 3/2014 | Oba | D23/370 |
| 8,821,229 B2 | * | 9/2014 | Stan | A01F 12/444 |
| | | | | 460/99 |
| D716,934 S | * | 11/2014 | Hertreiter | D23/365 |
| 9,125,346 B2 | * | 9/2015 | Schulz | A01F 12/444 |
| 9,295,197 B1 | | 3/2016 | Veikle et al. | |
| D827,672 S | * | 9/2018 | Kneip | D15/5 |
| 2002/0025252 A1 | * | 2/2002 | Gatley, Jr. | F01D 25/24 |
| | | | | 415/204 |
| 2002/0037758 A1 | * | 3/2002 | Visagie | A01F 12/444 |
| | | | | 460/99 |
| 2004/0012125 A1 | | 1/2004 | Plant et al. | |
| 2004/0014512 A1 | * | 1/2004 | Linder | A01D 41/12 |
| | | | | 460/119 |
| 2004/0219013 A1 | * | 11/2004 | Hopfensperger | F04D 29/281 |
| | | | | 415/206 |
| 2004/0240994 A1 | * | 12/2004 | Cole | F04D 29/4226 |
| | | | | 415/215.1 |
| 2004/0253916 A1 | * | 12/2004 | Lukac | A01D 46/08 |
| | | | | 454/100 |
| 2006/0051205 A1 | * | 3/2006 | Platz | F04D 29/4233 |
| | | | | 415/206 |
| 2006/0051206 A1 | * | 3/2006 | Lyons | F04D 29/4226 |
| | | | | 415/206 |
| 2006/0099072 A1 | * | 5/2006 | Lyons | F04D 29/4226 |
| | | | | 415/214.1 |
| 2010/0178171 A1 | * | 7/2010 | Ricketts | A01F 12/444 |
| | | | | 416/178 |
| 2011/0008161 A1 | * | 1/2011 | Choi | F04D 29/4246 |
| | | | | 415/204 |
| 2012/0184339 A1 | | 7/2012 | Schulz | |
| 2013/0170942 A1 | * | 7/2013 | Claerhout | A01F 12/444 |
| | | | | 415/1 |
| 2014/0035271 A1 | * | 2/2014 | Lei | F16L 55/07 |
| | | | | 285/14 |
| 2015/0345509 A1 | * | 12/2015 | Best | F04D 19/002 |
| | | | | 415/177 |
| 2018/0035613 A1 | * | 2/2018 | Hui | A01F 12/444 |
| 2018/0116114 A1 | * | 5/2018 | Craig | A01D 45/10 |
| 2019/0301470 A1 | * | 10/2019 | Watanabe | F04D 29/541 |

FOREIGN PATENT DOCUMENTS

| | | |
|---|---|---|
| EP | 3097768 A1 | 11/2016 |
| EP | 3208466 | 8/2017 |

* cited by examiner

COMBINE HARVESTER FAN HOUSING ASSEMBLY

BACKGROUND

Combine harvesters are used to gather and harvest a crop. Many harvesters utilize a chaffer (sometimes referred to as an upper sieve) and a sieve to separate grain from crop residue. Such combine harvesters utilize a fan or a series of fans to blow air through and/or across the chaffer and the sieve. While the heavier grain passes through the chaffer or sieve, the blown air carries the lighter crop residue off of the chaffer and sieve for discharge.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example combine harvester fan housing assemblies, example combine harvesters including such fan housing assemblies and an example method for providing a fan assembly in the cleaning shoe of a combine harvester. The disclosed fan housing assemblies, combine harvesters and methods utilize a less complex and more easily manufactured housing assembly for a fan that facilitates easier assembly to reduce cost.

Disclosed herein is an example combine harvester fan housing assembly that may include a fan enclosure formed as a single unitary body out of a polymeric material. The fan enclosure may include a spiral duct spiraling about an axis, a first axial inlet opening sized to axially receive a fan therethrough and a second axial inlet opening, a first discharge duct extending from the spiral duct and a second discharge duct extending from between the spiral duct and the first discharge duct. The combine harvester fan housing assembly may further include an inlet ring releasably mounted to the fan enclosure about the first axial opening, the Inlet ring projecting into the first axial opening by an extent so as to extend radially inward of blade ends of the fan.

Disclosed herein is an example combine harvester that may comprise a chaffer, a sieve below the chaffer and a series of fan assemblies. Each of the fan assemblies may comprise a fan having blades rotatable about an axis, the fan having a first diameter defined by blade ends. Each of the fan assemblies may further comprise a fan enclosure formed as a single unitary body out of a polymeric material. The fan enclosure may comprise a spiral duct spiraling about an axis, the fan, about a first axial inlet opening and a second axial inlet opening. First axial inlet opening may have a second diameter greater than the first diameter of the fan. A first discharge duct may extend from the spiral duct in a direction towards the sieve while a second discharge duct may extend from between the spiral duct and the first discharge duct in a direction towards the chaffer. An inlet ring may be releasably mounted to the fan enclosure about the first axial opening, wherein the inlet ring projects into the first axial opening by an extent so as to extend radially inward of the blade ends of the fan.

Disclosed herein is an example method for providing a fan assembly in a cleaning shoe of a combine harvester having a chaffer and a sieve. The method may comprise blow molding a fan enclosure as a single unitary body, wherein the fan enclosure may comprise a spiral duct spiraling about an axis, a first axial inlet opening sized to axially receive a fan therethrough and a second axial inlet opening, a first discharge duct extending from the spiral duct in a direction towards the sieve and a second discharge duct extending from between the spiral duct and the first discharge duct in a direction towards the chaffer. The method may further involve axially inserting the fan through the first axial inlet opening, the fan having a diameter defined by blade ends. Following insertion of the fan through the first axial inlet opening into the fan enclosure, an inlet ring may be releasably mounted to the fan enclosure about the first axial opening, wherein the inlet ring has an inner ring diameter less than the diameter of the fan.

In one implementation, the method may further comprise blow molding a second fan enclosure, wherein the second fan enclosure may comprise a second spiral duct spiraling about an axis, a third axial inlet opening sized to axially receive a second fan therethrough and a fourth axial inlet opening, a third discharge duct extending from the second spiral duct in a direction towards the sieve; and a fourth discharge duct extending from between the second spiral duct and the third discharge duct in a direction towards the chaffer. The method may further involve serially mounting the fan and the second fan onto a driveshaft, the second fan having the diameter. While the fan and the second fan are mounted onto the drive shaft and prior to the releasable mounting of the inlet ring to the fan enclosure, second fan may be passed through the first axial inlet opening, through the second axial inlet opening and through the third axial inlet opening to within the second fan enclosure and the fan the fan may be passed through the first axial inlet opening to within the fan enclosure. Following positioning of the fan in the fan enclosure and the second fan in the second fan enclosure, the inlet ring may be releasably mounted about the first axial inlet opening, a second inlet ring may be releasably mounted about the second axial inlet opening, and a third inlet ring may be releasably mounted about the third axial inlet opening, wherein the second inlet ring and the third inlet ring each has an inner ring diameter less than the diameter of each of the fan and the second fan.

Figure 1:
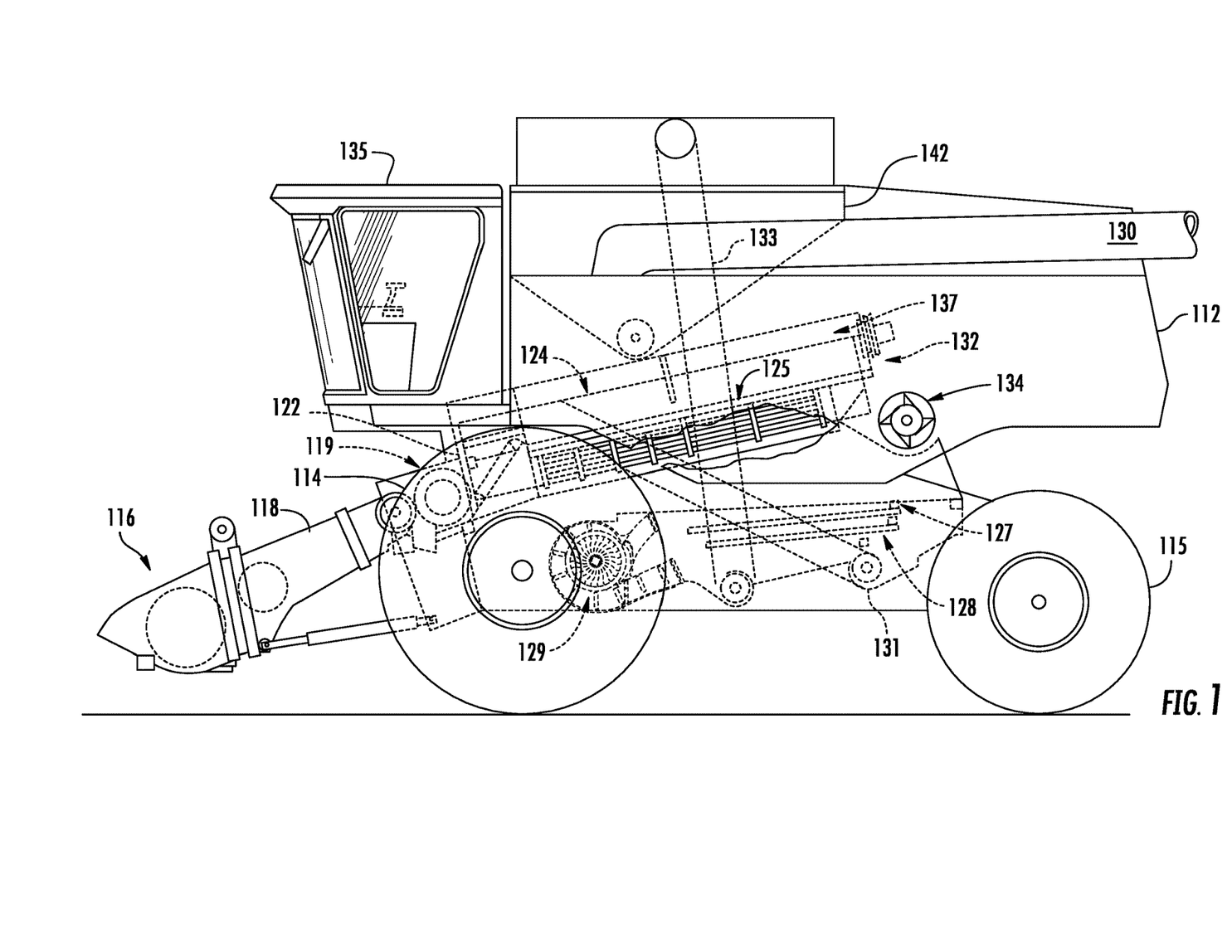
FIG. 1 is a side elevational view of portions of an example combine harvester having an example fan assembly.

FIG. 1 illustrates portions of an example combine harvester 100. 1. FIG. 1 is a side view of portions of harvester 100. Harvester 100 utilizes a less complex and more easily manufactured housing assembly for a fan that facilitates easier assembly to reduce cost. Harvester 100 comprises a main frame 112 having front and rear ground engaging wheels 114 and 115 supporting the main frame for forward movement over a field of crop to be harvested. The front wheels 114 are driven by an electronically controlled hydrostatic transmission.

A vertically adjustable header or harvesting platform 116 is used for harvesting a crop and directing it to a feeder house 118. The feeder house 118 is pivotally connected to the frame 112 and includes a conveyor for conveying the harvested crop to a beater 119. The beater 119 directs the crop upwardly through an inlet transition section 122 to a rotary threshing and separating assembly 124. In other implementations, other orientations and types of threshing structures and other types of headers 116, such as transverse frame supporting individual row units, are utilized.

The rotary threshing and separating assembly 124 threshes and separates the harvested crop material. Grain and chaff fall through separation grates of a concave 125 on the bottom of the assembly 124 to a cleaning system 126 and are cleaned by a chaffer 127, a sieve 128 and blower or fan system 129. The cleaning system 126 removes the chaff and directs the clean grain to elevator 133. Clean grain elevator 133 conveys the grain to grain tank 142. The clean grain in the tank 142 can be unloaded into a grain cart or truck by unloading auger 130. Tailings fall into the return elevator or auger 131 and are conveyed to the rotor 137 where they are threshed a second time.

Threshed and separated straw is discharged from the rotary threshing and separating assembly 124 through an outlet 132 to a discharge beater 134. The discharge beater 134, in turn, propels the straw out the rear of the combine. It should be noted that the discharge beater 134 could also discharge crop material other than grain directly to a straw chopper. The operation of the combine is controlled from an operator's cab 135.

Figure 2:
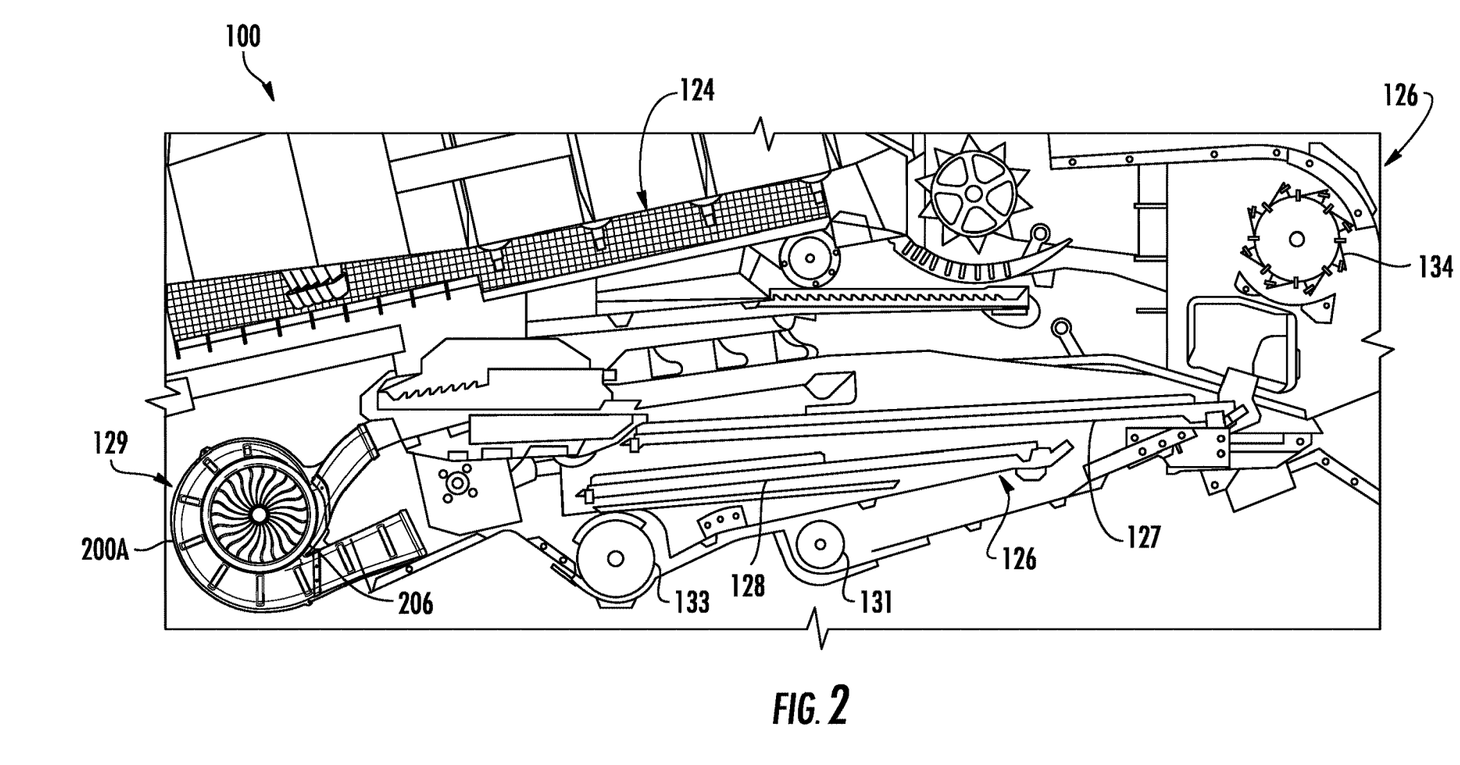
FIG. 2 is an enlarged sectional view of the combine harvester of FIG. 1 illustrating the example fan assembly in detail.
Figure 3:
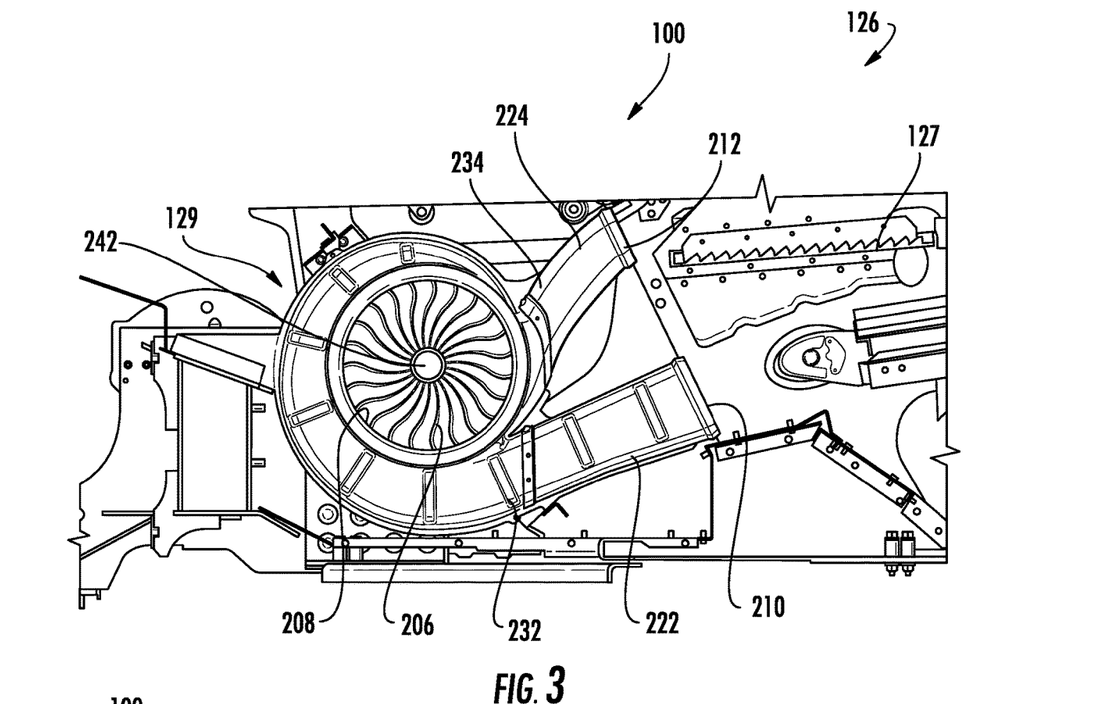
FIG. 3 is an enlarged sectional view of the combine harvester of FIG. 2 illustrating the example fan assembly in more detail.
Figure 4:
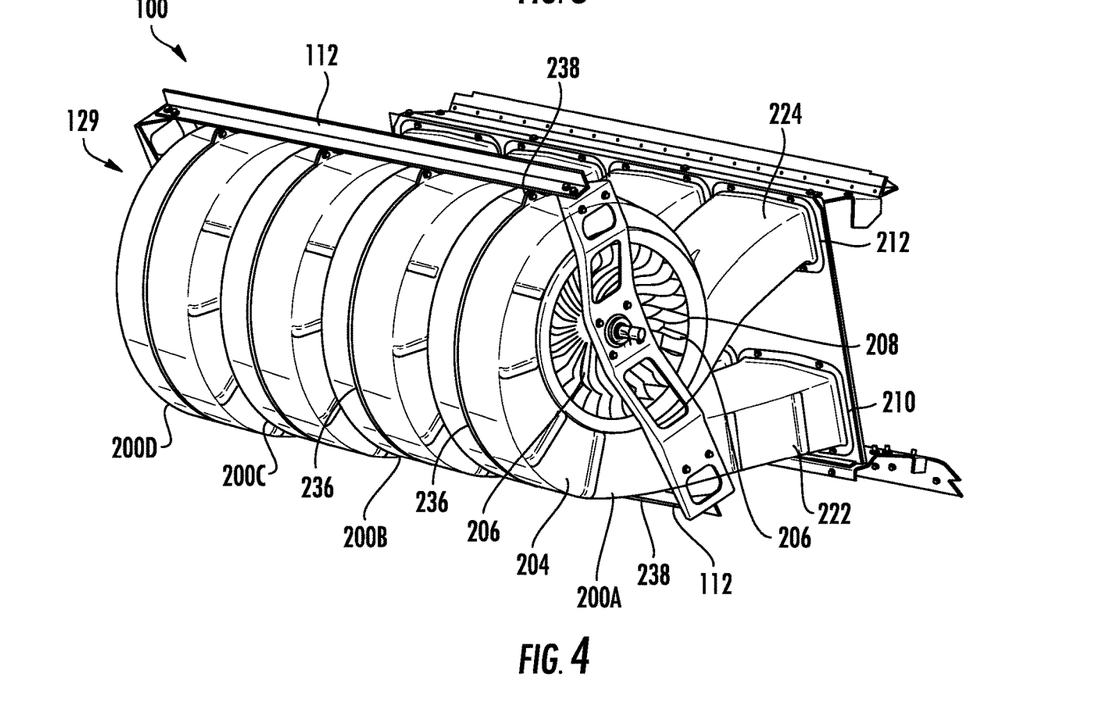
FIG. 4 is a front perspective view of the example fan assembly of FIG. 3.

FIGS. 2-4 illustrate blower or fan system 129 in more detail. FIG. 2 is an enlarged sectional view illustrating cleaning system 126 and fan system 129 in more detail. FIG. 3 is an enlarged side view illustrating fan system 129 is part of cleaning system 126. FIG. 4 is a perspective view illustrating fan system 129.

As shown by FIGS. 2-4, fan system 129 comprises a series of individual fan assemblies 200A, 200B, 200C and 200D (collectively referred to as fan assemblies 200) arranged in front of chaffer 127 and sieve 128. Each of fan assemblies 200 comprises a fan housing assembly 204 which encloses an internal fan 206. Fan 206 is operably coupled to a torque source, such as a motor, so as to drive air received through inlet openings 208 through and out a lower discharge opening 210 which directs the pressurized air through and across sieve 128 and an upper discharge opening 212 which directs pressurized air through and across chaffer 127. Although harvester 100 is illustrated as comprising four serially arranged fan assemblies 200, in other implementations, harvester 100 may include a greater or fewer of such fan assemblies 200.

Figure 5:
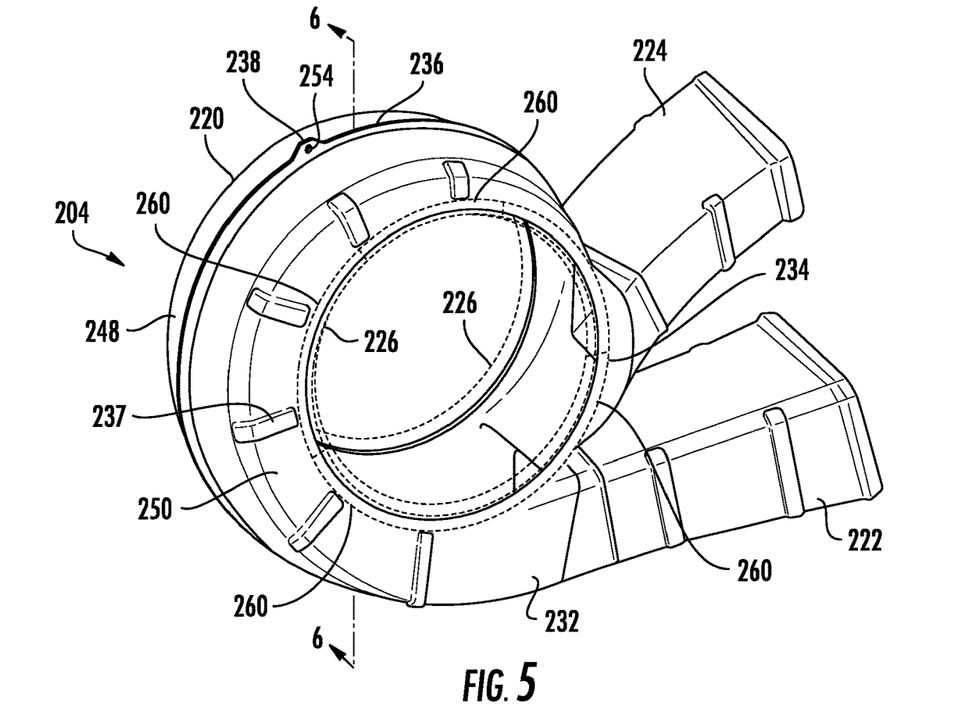
FIG. 5 is a front perspective view of an example fan housing assembly of the example fan assembly of FIG. 3.

FIGS. 5-8 illustrate fan housing assembly 204 in detail. FIG. 5 is a front perspective view of fan housing assembly 204. As shown by FIG. 5, fan housing assembly 204 comprises fan enclosure 220, discharge duct extension 222, discharge duct extension 224 and inlet rings 226. Fan enclosure 220 receives and extends about fan 206, serving as a plenum or manifold for guiding and directing the flow of air produced by fan 206 towards sieve 128 and chaffer 127. Fan enclosure 220 is formed as a single unitary body out of at least one polymeric material. In the example illustrated, fan enclosure 220 is shaping configured so as to be formed through a blow molding process. In other implementations, fan enclosure 220 may be formed as a single unitary, integral, homogenous body in other fashions.

Figure 6:
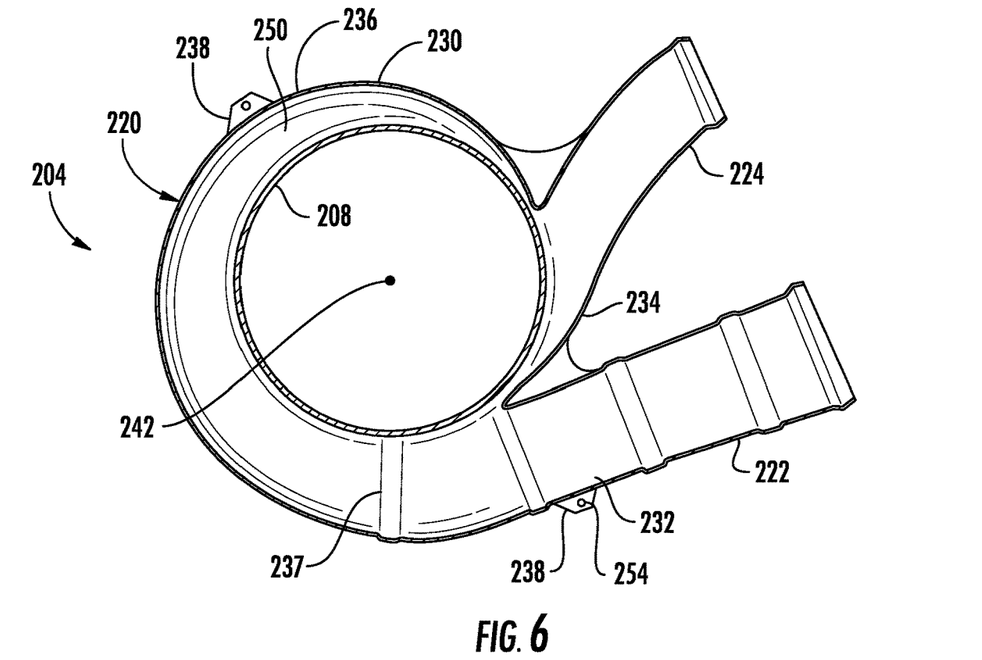
FIG. 6 is a sectional view of the fan housing assembly of FIG. 5.

FIG. 6 is a sectional view of fan enclosure 20. As shown by FIGS. 5 and 6, fan enclosure 220 comprises spiral duct 230, discharge duct 232, discharge duct 234, rib 236, ribs 237, and mounting portions 238. Spiral duct 230 comprises a duct which forms an air directing channel spirals about axis 242, the axis about which fan 206 rotatably driven and the center axis of inlet opening 208. In the example illustrated, spiral duct 230 gradually increases inside as it approaches discharge duct 232. Spiral duct 230 directs pressurized air produced by the rotation of fan 206 (shown in FIGS. 2-4) to discharge duct 232.

Discharge duct 232 comprises a duct extending from spiral duct 230. Discharge duct 232 is joined to discharge duct extension 222. In one implementation, discharge duct 232 is fastened, bonded or releasably snapped to discharge duct extension 222. In such an implementation, because discharge duct extension 222 is separate from fan enclosure 220 and mounted to fan enclosure 220, fan enclosure 220 may be more easily fabricated as a single unitary body, such as by being blow molded as a single unitary body. In other implementations, discharge duct 232 may be integrally formed as part of a single unitary body with discharge duct extension 222 such that discharge duct extension 222 is formed as part of a single unitary body with fan enclosure 220.

Discharge duct 234 comprise a duct extending from inlet opening 208 between spiral duct 230 and discharge duct 38. Discharge duct 234 receives pressurized or driven air directly from fan 206 (shown in FIGS. 2-4). Discharge duct 234 projects from inlet opening 208 on a same side of fan enclosure 220 as discharge duct 238. In particular, discharge duct 234 and discharge duct 232 both extend and face in a rearward direction from inlet opening 208. Discharge duct 234 and discharge duct 232 each direct air rearwardly without reversing the direction of air flow produced by fan 206. In other words, ducts 232 and 234 do not turn airflow 180°. As a result, the delivery of blown air may be more efficient.

Discharge duct 234 is joined to discharge duct extension 224. In one implementation, discharge duct 234 is fastened, bonded or releasably snapped to discharge duct extension 224. In such an implementation, because discharge duct extension 224 is separate from fan enclosure 220 and mounted to fan enclosure 220, fan enclosure 220 may be more easily fabricated as a single unitary body, such as by being blow molded as a single unitary body. In other implementations, discharge duct 232 may be integrally formed as part of a single unitary body with discharge duct extension 222 such that discharge duct extension 224 is formed as part of a single unitary body with fan enclosure 220.

Rib 236 comprises an upright wall or flange projecting outwardly from and along the exterior or outer perimeter of spiral duct 230. In one implementation, rib 236 extends along a centerline of fan enclosure 220, being contained within a plane that is perpendicular to axis 242 and that bifurcates spiral duct 230. Rib 236 strengthens the outer wall 48 of spiral duct 230, facilitating thinner walls for spiral duct 230 to reduce weight and cost. In other implementations, rib 236 may be omitted.

Ribs 237 comprise ribs formed along the exterior of fan enclosure 220. Ribs 237 generally extends perpendicular to the airflow, across the height of the channel formed by spiral duct 230. Ribs 237 further strengthen the sidewalls 250 of spiral duct 230, facilitating thinner walls for spiral duct 230 to reduce weight and cost. In other implementations, rib 237 may be omitted or may take other forms.

Mounting portions 238 comprise structures extending from ribs 236 that facilitate the mounting of fan enclosure 220 to frame 112 of harvester 100. In the example illustrated, mounting portions 238 each comprise an extension panel flat having an opening 254 therethrough. Opening 254 may be aligned with a corresponding opening in frame 112 for the use of a fastener to mount fan enclosure 220 to harvester 100. As a result, fan enclosure 220 may be secured to harvester 100 with fewer or no additional brackets or other supporting structures. In yet other implementations, mounting portion 238 may be omitted.

Discharge duct extension 222 comprise a duct extension extending from discharge duct 232. Discharge duct extension 222 directs air towards, through and across sieve 128. Discharge duct extension 224 comprises a duct extension extending from discharge duct 234. Discharge duct extension 234 directs air towards, through and across chaffer 126.

Inlet rings 226 comprises annular structures releasably mounted to fan enclosure 220 about the actual inlet opening 208 to reduce the size of axial inlet opening 208 on opposite sides of fan 206 (when fan 206 is received within inlet opening 208 alongside spiral duct 230). Inlet ring 226 project into axial opening 208 by extent so as to extend radially inward of blade ends 207 of fan 206. Inlet ring 226 facilitate a larger sized inlet opening 208 such that, prior to the mounting of at least one of inlet rings 226, fan 206 may be axially inserted into opening 208 during assembly. Once fan 26 has been inserted into opening 208, across from spiral duct 230, inlet ring 226 may be releasably mounted to fan enclosure 220. For purposes of this disclosure, the term "releasably" or "removably" with respect to an attachment or coupling of two structures means that the two structures may be repeatedly connected and disconnected to and from one another without material damage to either of the two structures or their functioning. Inlet rings 226 reduce the size of inlet openings 208, projecting beyond the tips of the blades of fan 206, to reduce escape of air through inlet opening 208 so as to increase the efficiency at which air is driven by fan 206 into discharge duct 232 and discharge duct 234. In one implementation, inlet rings 226 reduce the diameter of inlet opening 208 by at least 15 mm.

Figure 7:
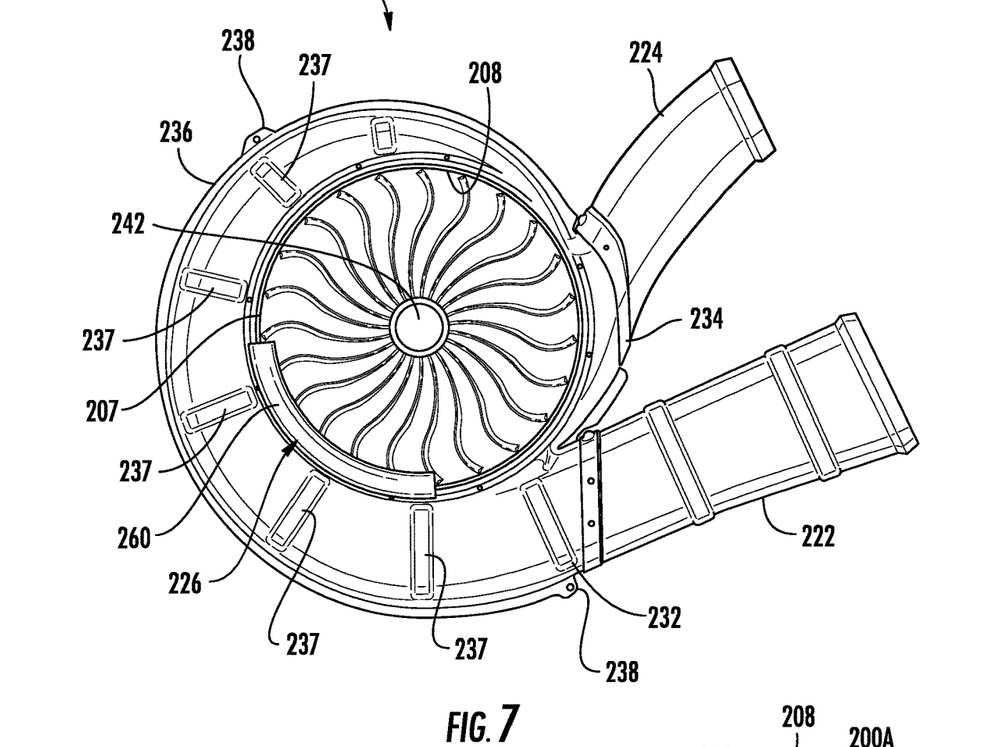
FIG. 7 is a side elevational view of the fan housing assembly of FIG. 6, illustrating a portion of an example inlet ring.
Figure 8:
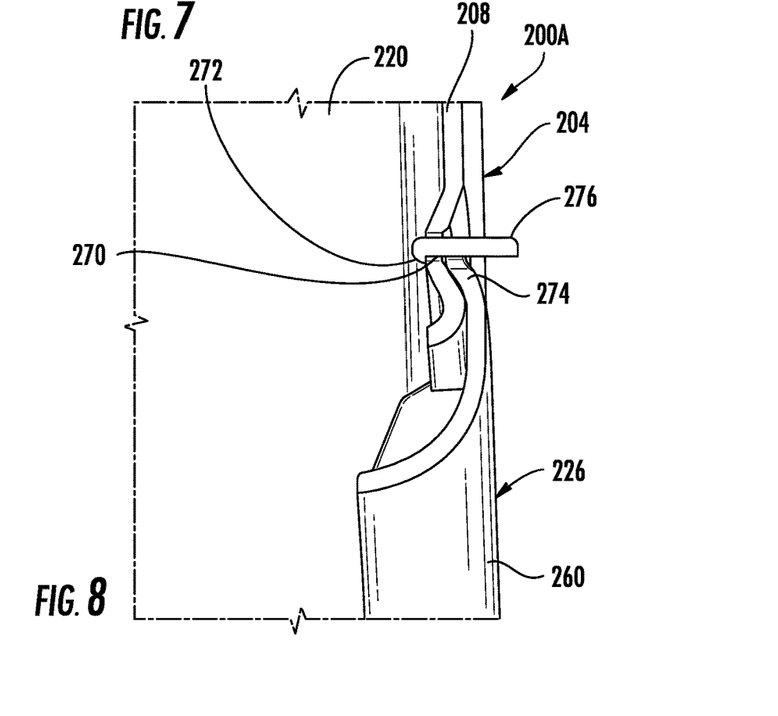
FIG. 8 is an enlarged fragmentary sectional view illustrating releasable mounting of the example inlet ring to an example fan enclosure of the fan housing assembly of FIG. 7.

FIGS. 7 and 8 illustrate one example inlet ring 226 in more detail. In the example illustrated, each of inlet rings 226 is formed from multiple ring segments 260 (one of which is shown in FIG. 7) releasably mounted to fan enclosure 220 about an alongside opening 208. As will be described hereafter, because each of inlet rings 226 comprises at least two segments which are independently and individually mounted to fan enclosure 220, inlet rings 226 may be formed about openings 208 from the transverse sides of axis 242, in the presence of an elongate drive shaft extending through and across opening 208. In the example illustrated, each of inlet rings 226 is formed from four individual segments 260. In other implementations, each of inlet rings 226 may be formed from two, three or greater than four individual segments.

In still other implementations, inlet rings 226 may be formed by a single continuous ring having a slit separating a first end of the ring from a second end of the ring, wherein the slit is sufficiently large for the passage of a driveshaft, such as drive shaft 211 therethrough. In another implementation, inlet rings 226 may be formed as a continuous ring that is cut such that the ring has a first end that abuts a second end, wherein the ring is sufficiently flexible such that the first end and the second end may be spread apart to facilitate passage of a driveshaft, such as driveshaft 211, between the first end and the second end to a center of the ring, wherein the ends may be brought back into an abutting relationship following insertion of the driveshaft and when the ring is being mounted to the fan enclosure.

FIG. 8 illustrates one example by which inlet rings 226 may be releasably mounted to fan enclosure 220 about opening 228 along the perimeter of opening 208 so as to reduce the internal diameter of opening 208. In the example illustrated in FIG. 8, inlet rings 226 are releasably or removably mounted such that they may be attached to or separated from fan enclosure 220 without the use of additional tools. In the example illustrated, inlet rings 226 are configured to be releasably snapped and held in place with respect to fan enclosure 220. For purposes of this disclosure, the phrase "configured to" denotes an actual state of configuration that fundamentally ties the stated function/use to the physical characteristics of the feature proceeding the phrase "configured to". In the example illustrated, one of the fan enclosure 220 inlet ring 226 comprises a detent while the other of the fan enclosure 220 and the inlet ring 226 comprises a catch releasably snapped into engagement with the detent. As shown by FIG. 8, spaced portions of fan enclosure 220 alongside and about the perimeter of opening 208 include detents 270 (one of which is shown) while each of segments 260 of inlet ring 226 comprise a corresponding catch 272 which releasably catches or hooks on to and about the detent 2702 releasably mount the individual segment 260 to fan enclosure 220 to cooperate with others segments 260 to form inlet ring 226. In one implementation come each segment 260 may comprise at least two spaced catches 270 corresponding to detents 272 at predefined locations in fan enclosure 220 along the perimeter of opening 208.

In the example illustrated, each of catches 270 is supported by a resiliently bendable or flexible arm 274 having a lever 276. Arm 274 may form a living hinge about which catch 272 may be resiliently pivoted out of engagement with detent 270. In the example illustrated, arm 274 is configured so as to resiliently biased catch 272 towards and engage state with hook 270. Lever 276 projects from arm 274 and provides a structure surface by which a person may manually rip or apply force to arm 274 so as to pivot catch 272 against the bias of arm 274 four disengaging catch 272 from detent 270. In other implementations, each of segments 260 may be releasably mounted to fan enclosure 220 by other releasable mounting mechanisms.

Figure 9:
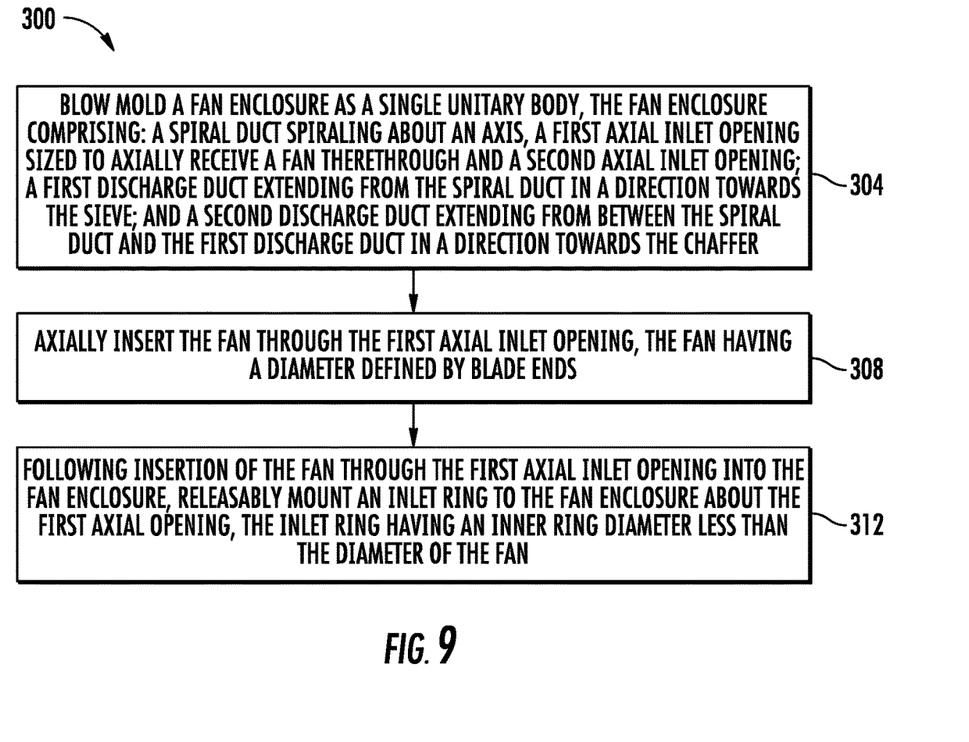
FIG. 9 is a flow diagram of an example method for providing a fan assembly in a cleaning shoe of a combine harvester having a chaffer and a sieve.

FIG. 9 is a flow diagram of an example method 300 for providing a fan assembly in a cleaning shoe of a combine harvester having a chaffer and a sieve. As indicated by block 304, a fan enclosure is blow molded as a single unitary body. The fan enclosure may comprise a spiral duct spiraling about an axis, a first axial inlet opening sized to axially receive a fan therethrough and a second axial inlet opening, a first discharge duct extending from the spiral duct in a direction towards the sieve and a second discharge duct extending from between the spiral duct and the first discharge duct in a direction towards the chaffer. FIGS. 5-8 illustrate one example of such a blow molded fan enclosure 220.

Figure 10:
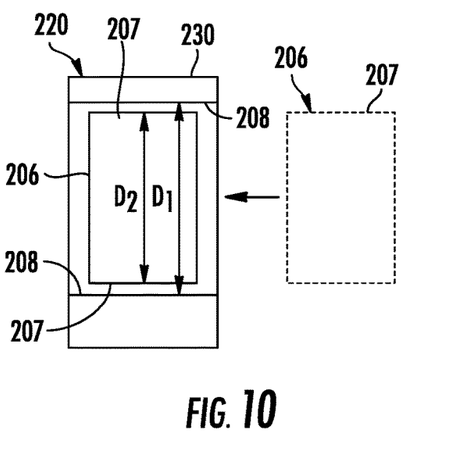
FIG. 10 is schematic diagram illustrating insertion of an example fan into portions of an example fan housing assembly.

As indicated by block 308 and schematically illustrated in FIG. 10, a fan is axially inserted through the first axial inlet opening having an inner diameter D1, the fan having a diameter D2 defined by blade ends. The diameter D2 is less than or equal to the diameter D1. FIG. 10 schematically illustrates fan 206 having blade ends 207 being axially inserted through opening 208 to the interior of spiral duct 230 of fan enclosure 220, wherein the diameter of opening 208 is greater than the diameter of fan 206 as defined by blade ends 207. As a result, the size of opening 208 does not restrict the axial insertion of fan 206.

Figure 11:
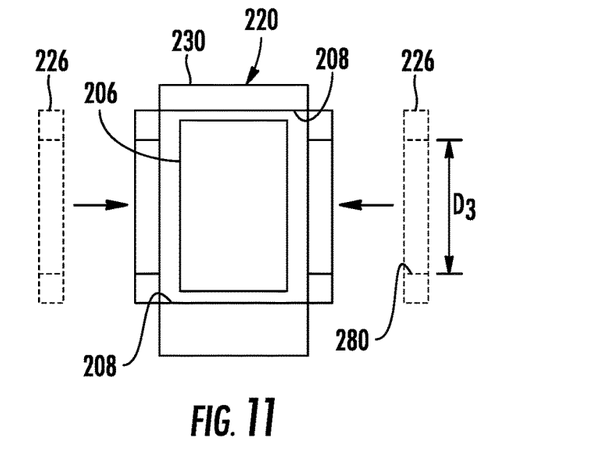
FIG. 11 is a schematic diagram illustrating releasable mounting of inlet rings to the example fan housing assembly of FIG. 10 following insertion of the example fan.

As indicated by block 312 and schematically shown in FIG. 11, following insertion of the fan through the first axial inlet opening into the fan enclosure, an inlet ring may be releasably mounted to the fan enclosure about the first axial opening, wherein the inlet ring has an inner ring diameter less than the diameter of the fan FIG. 11 schematically illustrates two example inlet rings 226 removably or releasably mounted to fan enclosure 220 about opening 208 while fan 206 is retained between openings 208, alongside.230 of fan enclosure 220. Inlet rings 226 each have an opening 280 having an inner diameter D3 that is less than D2. As a result, the size of inlet openings 208 is reduced to be less than diameter D2, providing enhanced pressurized air flow guidance for the air flow produced by fan 206. As described above, in one implementation, inlet rings 226 may be each collectively formed from multiple ring segments 260 mounted to one another or mounted directly to fan enclosure 220. In yet other implementations, rather being collectively formed from multiple independent segments, each of inlet rings 226 may be a single unitary are solid annular ring.

Figure 12:
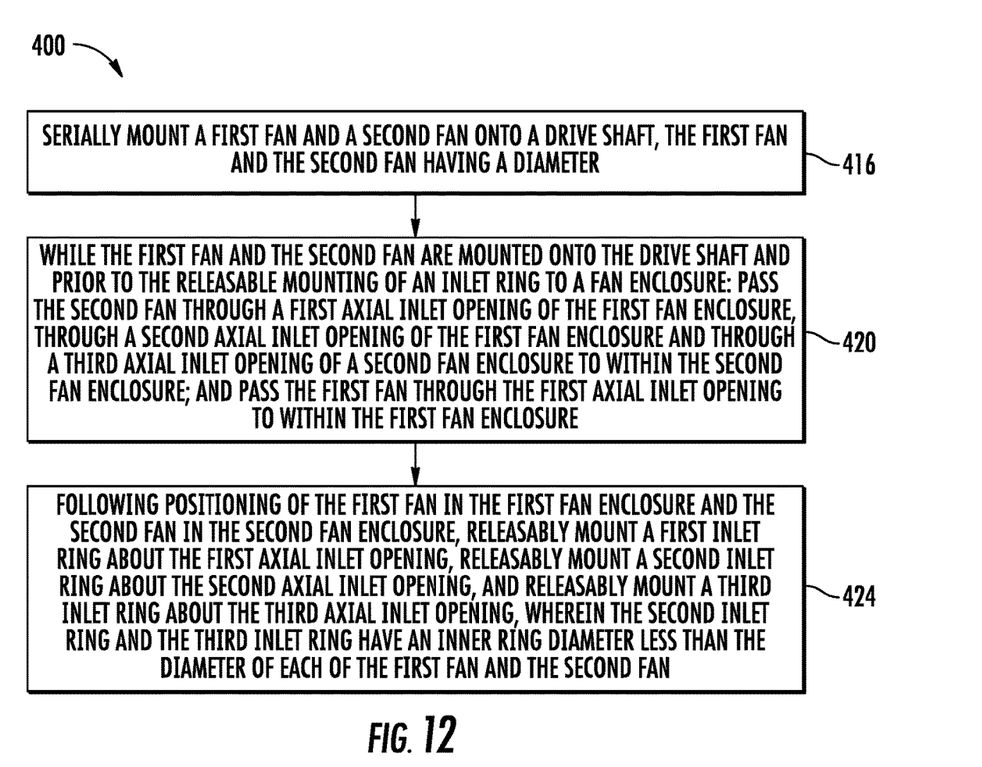
FIG. 12 is schematic diagram illustrating insertion of an example fan into portions of an example fan housing assembly.

FIG. 12 is a flow diagram of an example method 400 for providing a fan assembly in a cleaning shoe of a combine harvester having a chaffer and a sieve. Prior to carry out method 400, at least two fan enclosures are blow molded, each fan enclosure comprising a single unitary body as described in block 304 with respect to method 300 or as depicted in FIGS. 5-8.

Figure 13:
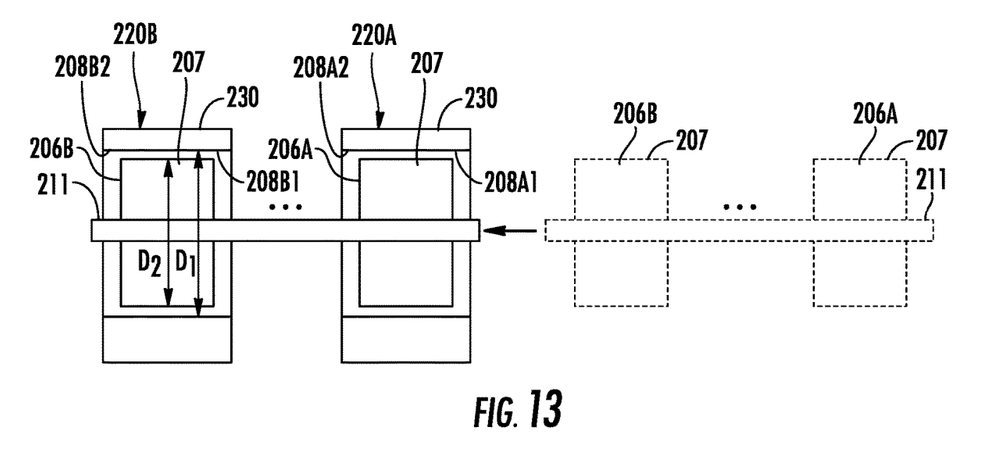
FIG. 13 is a schematic diagram illustrating mounting of fans upon a driveshaft and axial insertion of the driveshaft and fans into consecutive portions of fan housing assemblies.

As indicated by block 416 and as schematically depicted in FIG. 13, a first fan and a second fan are serially mounted onto a driveshaft. Each of the first fan and the second fan have a diameter, the diameter being defined by the outermost perimeter of the fan with respect to the rotational axis of the fan. In one implementation, the outermost diameter of the fan defined by the tips of the blades or blade ends (the diameter extending from the tip of a first blade to the tip of a second blade angularly spaced from the first blade by 180° with respect to the rotational axis of the fan). FIG. 13 schematically illustrates the serial mounting of two fans 206A and 206B onto a single driveshaft 211.

As indicated by block 420, while the first fan and the second fan are mounted onto the drive shaft and prior to the releasable mounting of the inlet ring to the fan enclosure, the second fan is passed through the first axial inlet opening 208A1, through the second axial inlet opening and through the third axial inlet opening to within the second fan enclosure. The first fan is passed through the first axial inlet opening to within the first fan enclosure. FIG. 13 further schematically illustrates the insertion of the first fan 206A and the second fan 206B, while mounted to the drive shaft 211 axially through (being linearly moved and translated along the axis of shaft 211 and along the axial centerline of openings 208) inlet openings 208 per block 420. FIG. 13 illustrates axial insertion of second fan through the first axial inlet opening 208A1, through the second axial inlet opening 208A2 and through the third axial inlet opening 208B1 to within the second fan enclosure 220B. FIG. 13 further schematically illustrates axial insertion of the first fan 206A through the first axial inlet opening 208A1 to within the first fan enclosure.

Figure 14:
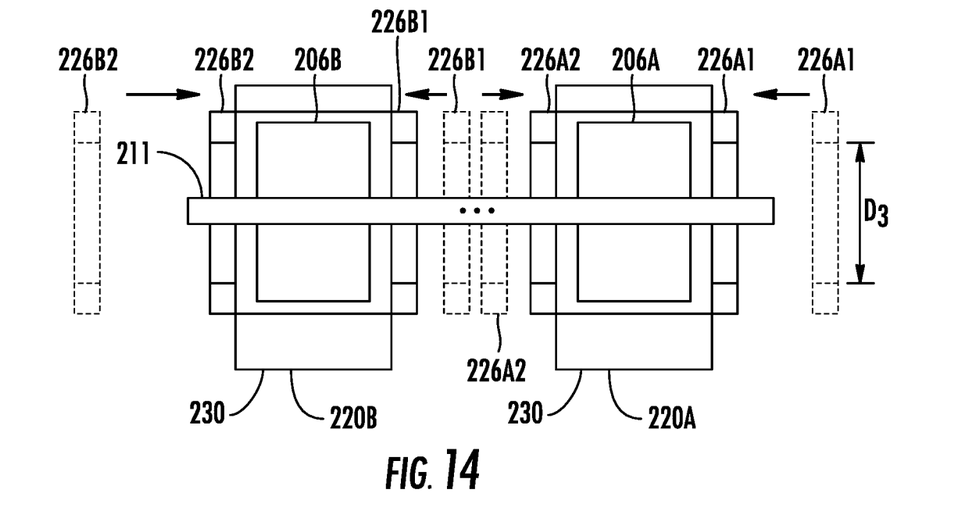
FIG. 14 is a schematic diagram illustrating releasable mounting of inlet rings to the example fan housing assemblies of FIG. 13 following insertion of the example fans.

As indicated by block 424, following positioning of the first fan in the fan enclosure and the second fan in the second fan enclosure, second inlet ring is releasably mounted about the first axial inlet opening, a second inlet ring is releasably mounted about the second axial inlet opening, a third inlet ring is releasably mounted about the third axial inlet opening, wherein the first inlet ring, the second inlet ring and the third inlet ring each has an inner ring diameter less than the diameter of each of the first fan and the second fan. FIG. 14 schematically illustrates the mounting of a first inlet ring 226A1 about inlet opening 208A1, mounting of a second inlet ring 226A2 about inlet opening 208A2, the mounting of a third inlet ring 226B1 about inlet opening 208B1 and the mounting of a fourth inlet ring 226B2 about inlet opening 208B2. As a result, the size of inlet openings 208A1, 208A2, 208B1 and 208B2 are reduced to be less than diameter D2, providing enhanced pressurized air flow guidance for the air flow produced by fans 206A and 206B. As described above, in one implementation, inlet rings 226 may be each collectively formed from multiple ring segments 260 mounted to one another or mounted directly to fan enclosure 220. In yet other implementations, rather being collectively formed from multiple independent segments, each of inlet rings 226 may be a single unitary are solid annular ring.

Figure 15:
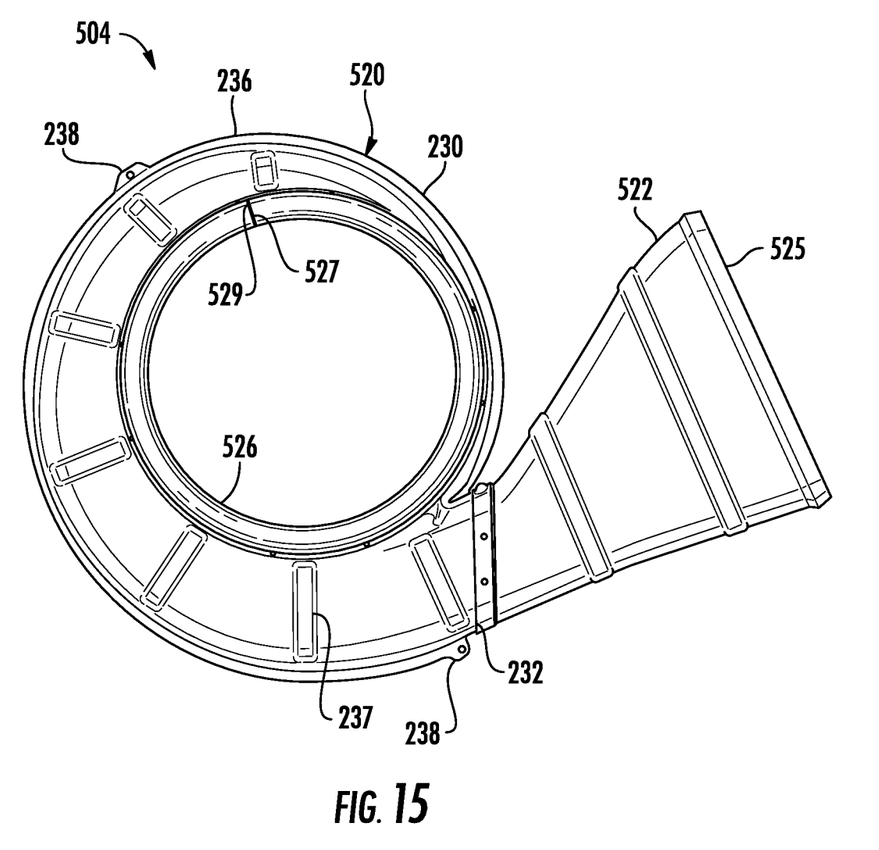
FIG. 15 is a side view of an example fan housing assembly.

FIG. 15 is a side view illustrating another example fan housing assembly 504 may be used in place of the above-described fan housing assemblies. Fan housing assembly 504 comprises fan enclosure 520, discharge duct extension 522 and inlet rings 226 (one of which is transparently shown to illustrate the overlap and radially inward extension of rings 226). Fan enclosure 520 is similar to fan enclosure 220 described above except that fan enclosure 520 omits discharge duct 234 and instead has a single discharge duct 232. The walls of spiral duct 230 are imperforate and spiral from above discharge duct 232 to below discharge duct 232. The remaining components of fan enclosure 520 which correspond to components of fan enclosure 220 are numbered similarly. As with fan enclosure 220, fan enclosure 520 as an architecture or configuration that facilitates fan enclosure 520 being blow molded as a single unitary body. Fan enclosure 520 further comprises ribs 236, 237 and mounting portion 238, strengthening fan enclosure 520 and facilitating the mounting of fan enclosure 5202 mounting structures of a combine harvester without additional brackets or other mounting structures.

Discharge duct extension 522 extends from discharge duct 232. Discharge duct extension 522 is similar to discharge duct extension 222 described above. In one implementation, discharge duct extension 522 may be secured to discharge duct 232 by rivets. In other implementations, discharge duct extension 522 may be connected to discharge duct 232 in other fashions. In some implementations, discharge duct 52 may be formed as a single unitary body with fan enclosure 520.

As further shown by FIG. 14, discharge duct extension 522 comprises a enlarged mouth 525. Mouth 525 is sufficiently enlarged so as to direct air in a further upward direction as compared to discharge duct extension 222. In one implementation, mouth 525 is sufficiently large so as to direct blown air through and across a chaffer of the combine harvester.

Inlet rings 526 are similar to inlet rings 226 described above except that inlet rings 526 are each formed as a continuous ring that is cut such that the ring 526 has a first end 527 that abuts a second end 529, wherein the ring 526 is sufficiently flexible such that the first end and the second end may be spread apart to facilitate passage of a driveshaft, such as driveshaft 211 (shown in FIG. 14), between the first end 527 and the second end 529 to a center of the ring 526, wherein the ends 527, 529 may be brought back into an abutting relationship following insertion of the driveshaft and when the ring 526 is being mounted to the fan enclosure 520. In one implementation, inlet ring 526 are formed from a resiliently flexible polymer or rubber-like material. In one implementation, ends 527, 529 are spreadable to space ends 527 and 529 at least 0.5 inches apart from one another, and in one implementation, at least 1 inch apart from one another for the passage of a driveshaft.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A combine harvester fan housing assembly comprising:
a fan enclosure formed as a single unitary body out of a polymeric material, the fan enclosure comprising:
  a spiral duct spiraling about an axis, the spiral duct comprising a U-shaped channel having a mouth facing in a radial direction towards the axis;
  a first axial inlet opening sized to axially receive a fan therethrough and a second axial inlet opening; and
  a discharge duct extending from the spiral duct; and
an inlet ring releasably mounted to the fan enclosure about the first axial opening, the inlet ring projecting into the first axial opening by an extent so as to extend radially inward of blade ends of the fan.

2. The combine harvester fan housing assembly of claim 1, wherein the U-shaped channel comprises a back wall spirally extending about the axis and a pair of side walls radially projecting from the back wall towards the axis and wherein the fan enclosure further comprises a rib projecting outwardly from the back wall and between the pair of side walls along an outer perimeter of the spiral duct.

3. The combine harvester fan housing assembly of claim 2 further comprising a mounting portion projecting from the rib, the mounting portion having a mounting opening.

4. The combine harvester fan housing assembly of claim 1, wherein the inlet ring comprises ring sections individually releasably mountable to the fan enclosure.

5. The combine harvester fan housing assembly of claim 1, wherein the second axial opening is sized to axially receive the fan therethrough, the assembly further comprising a second inlet ring releasably mounted to the fan enclosure about the second axial opening, the second inlet ring projecting into the second axial opening by an extent so as to extend radially inward of blade ends of the fan.

6. The combine harvester fan housing assembly of claim 1 further comprising a second discharge duct extending from between the spiral duct and the discharge duct, wherein the discharge duct and the second discharge duct are configured to direct air from the fan in a rearward direction without reversing a direction of airflow produced by the fan.

7. The combine harvester fan housing assembly of claim 6 further comprising a first discharge duct extension extending from the discharge duct and a second discharge duct extension extending from the second discharge duct.

8. The combine harvester fan housing assembly of claim 7, wherein the first discharge duct extension and the second discharge duct extension are formed as part of the single unitary body of the fan enclosure.

9. The combine harvester fan housing assembly of claim 1, wherein one of the fan enclosure and the inlet ring comprises a detent and wherein the other of the fan enclosure and the inlet ring comprises a catch releasably snapped into engagement with the detent.

10. A combine harvester comprising:
a chaffer;
a sieve below the chaffer;
a series of fan assemblies, each of the fan assemblies comprising:
  a fan having blades rotatable about an axis, the fan having a first diameter defined by blade ends;
  a fan enclosure formed as a single unitary body out of a polymeric material, the fan enclosure comprising:
    a spiral duct spiraling about an axis, the fan, about a first axial inlet opening and a second axial inlet opening, the first axial inlet opening having a second diameter greater than the first diameter of the fan;
    a first discharge duct extending from the spiral duct in a direction towards the sieve; and
    a second discharge duct extending from between the spiral duct and the first discharge duct in a direction towards the chaffer; and
  an inlet ring releasably mounted to the fan enclosure about the first axial opening, the inlet ring projecting into the first axial opening by an extent so as to extend radially inward of the blade ends of the fan.

11. The combine harvester of claim 10, wherein the spiral duct comprises a U-shaped channel having a mouth facing in a radial direction towards the axis, wherein the U-shaped channel comprises a back wall spirally extending about the axis and a pair of side walls radially projecting from the back wall towards the axis and wherein the fan enclosure further comprises a rib projecting outwardly from the back wall and between the pair of side walls and along an outer perimeter of the spiral duct.

12. The combine harvester of claim 11 further comprising a mounting portion projecting from the rib, the mounting portion having a mounting opening.

13. The combine harvester of claim 10, wherein the inlet ring comprises ring sections individually releasably mountable to the fan enclosure.

14. The combine harvester of claim 10, wherein the second axial opening is sized to axially receive the fan therethrough, the assembly further comprising a second inlet ring releasably mounted to the fan enclosure about the second axial opening, the inlet ring projecting into the second axial opening by an extent so as to extend radially inward of blade ends of the fan.

15. The combine harvester of claim 10 further comprising a first discharge duct extension extending from the first discharge duct and a second discharge duct extension extending from the second discharge duct.

16. The combine harvester of claim 10, wherein the inlet ring comprises a continuous polymeric ring extending from a first end to a second end, wherein the inlet ring is flexible such that the first end and the second end are spreadable by at least 0.5 inches.

17. The combine harvester of claim 10, wherein one of the fan enclosure and the inlet ring comprises a detent and wherein the other of the fan enclosure and inlet ring comprises a catch releasably snapped into engagement with the detent.

18. The combine harvester of claim 10, wherein the spiral duct comprises a U-shaped channel having a mouth facing in a radial direction towards the axis, wherein the U-shaped channel comprises a back wall spirally extending about the axis and a pair of side walls radially projecting from the back wall towards the axis.

19. The combine harvester of claim 10, wherein the spiral duct spirals and narrows to a terminus at a first circumferential position about the axis, wherein the discharge duct extends from a second circumferential position about the axis and wherein the fan enclosure further comprises a second discharge duct extending from a third circumferential position about the axis between the first circumferential position and the second circumferential position.

20. A combine harvester fan housing assembly comprising:
    a fan enclosure formed as a single unitary body out of a polymeric material, the fan enclosure comprising:
        a spiral duct spiraling about an axis;
        a first axial inlet opening sized to axially receive a fan therethrough and a second axial inlet opening; and
        a discharge duct extending from the spiral duct; and
    an inlet ring releasably mounted to the fan enclosure about the first axial opening, the inlet ring projecting into the first axial opening by an extent so as to extend radially inward of blade ends of the fan, wherein the inlet ring comprises ring sections individually releasably mountable to the fan enclosure.

\* \* \* \* \*